# 2,947,725
POLYEPOXIDES, ETC.

Harold G. Cooke, Jr., Louisville, Ky., assignor to Devoe & Raynolds Company, Inc., Louisville, Ky., a corporation of New York No Drawing. Filed May 2, 1957, Ser. No. 656,488

2 Claims. (Cl. 260—47)

This invention relates to the production of high molecular weight polyepoxides, and includes the new polyepoxides and the method of preparing them.

The new polyepoxides are produced by reacting cyanuric acid with an excess of a diepoxide, or of a low melting epoxy resin, sufficient to react with all of the acid groups of the cyanuric acid and to give a polyepoxide reaction product.

The diepoxides used include aliphatic diepoxides and aromatic diepoxides such as the diglycidyl ethers of dihydric alcohols and dihydric phenols. Aliphatic diepoxides such as those described in Patent No. 2,581,464 or other aliphatic diepoxides can be used. A particularly valuable kind of diepoxides are the liquid or low melting point epoxide resins produced by the reaction of dihydric phenols and epichlorhydrin in the presence of caustic alkali. These resins may be essentially monomeric in character, such as a diglycidyl ether of a dihydric phenol, or they may be somewhat polymeric in character, and the average epoxide content of the resin may be somewhat less than that corresponding to a diepoxide.

These low melting diepoxides or epoxide resins include liquid and low melting diglycidyl ethers of dihydric phenols, and low melting resins having a weight per epoxide of less than about 1000. In referring to these resins as diepoxides, the amount of resin required to furnish two epoxide groups is used, and somewhat more than one mol of resin may be required to give this diepoxide equivalent.

Cyanuric acid is tri-functional and has three acid groups which can react with an epoxide group of the diepoxide. Three mols of a diepoxide can react with one mol of cyanuric acid, through one of their epoxide groups, to give a product which is essentially a triepoxide. Such a triepoxide, resulting from the reaction of three mols of a diglycidyl ether of a dihydric alcohol or phenol with one mol of cyanuric acid is illustrated by the following structure, in which R is the hydrocarbon residue of the dihydric alcohol or phenol.

Cyanuric acid, because of its tri-functional nature, will, if used in sufficient amount, act as a cross-linking agent and form insoluble, infusible reaction products.

According to the present invention, a limited amount of cyanuric acid is used with a sufficiently large excess of diepoxide so that higher melting point epoxide resins are produced and particularly high melting point epoxide resins which have three or more epoxide groups in their large molecules.

In general, the portions of diepoxide and cyanuric acid should be such that there are about 1.5 to 2 epoxide groups of the diepoxide for each of the three hydroxyl groups of the cyanuric acid, or substantially more than twice as many molecules of diepoxide as of cyanuric acid.

The triepoxide of the formula above illustrated is monomeric in character. Products of a limited degree of polymerization can be obtained by using e.g. 5 mols of a diepoxide and 2 mols of cyanuric acid to form a product which is essentially a tetraepoxide. A polymeric product is also produced using e.g. 7 mols of a diepoxide and 3 mols of cyanuric acid, which appears to be largely a pentaepoxide. In any event, a sufficient excess of the diepoxide should be used so that when the cyanuric acid has been reacted, the product will be a soluble and fusible epoxide resin.

The reaction between the cyanuric acid and the diepoxide is advantageously carried out with the use of a catalyst, and particularly with a suitable organic base as a catalyst, such as tertiary amines, e.g., tripropyl amine and dimethyl aniline; quaternary ammonium hydroxides such as benzyl trimethyl ammonium hydroxide; quaternary ammonium salts such as benzyl trimethyl ammonium chloride; and quaternary ammonium ion-exchange resins. Quaternary ammonium salts such as benzyl trimethyl ammonium chloride are particularly advantageous.

The products will vary in their epoxide equivalents. The epoxide equivalent is the equivalent weight of the product per epoxide group. The method used for determining the epoxide content comprises heating 1 gram sample of the product with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide, using phenolphthalein as indicator, and considering that 1 HCl is equivalent to 1 epoxide group.

The invention will be further illustrated by the following examples, but it will be understood that the invention is not limited thereto. In the examples, the parts are by weight. The melting points and epoxide values are those of the solvent-free resin.

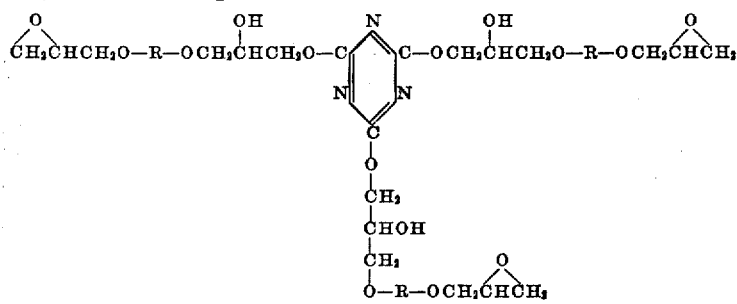

The product of this formula is a triepoxide and has a much higher molecular weight than that of the diepoxide used in producing it. The cyanuric acid acts as a trifunctional reactant to react with one epoxide group of each of three mols of the diepoxide to form a high molecular weight triepoxide.

*Example 1*

The diepoxide used in this example was prepared as follows:

In a reaction vessel equipped with an agitator, thermometer and condenser, about 1 mol of bisphenol is dissolved in 10 mols of epichlorhydrin and 1 to 2 percent water is added to the resulting mixture. The mixture is then brought to 80° C. and 2 mols of sodium hydroxide are added in small portions over a period of about 1 hour. During the addition the temperature of the mixture is held at about 90° C. to 110° C. After the sodium hydroxide has been added, the water formed in the reaction and most of the epichlorhydrin is distilled off. The residue is combined with an approximately equal amount of benzene and the mitxure filtered to remove the salt. The benzene is then removed to yield a viscous liquid having a weight per epoxide of 185.

This diepoxide was reacted with cyanuric acid to produce a polyepoxide as follows:

Into a flask equipped with a reflux condenser, agitator and thermometer, is charged the diepoxide prepared as above described, 370 parts (1.0 mole); cyanuric acid, 43 parts (0.33 mol); and 6.5 parts of a 60 percent aqueous solution of benzyltrimethylammonium chloride (1 percent by weight based on the weight of the reactants) in addition to 150.0 parts of dioxane. The reaction mixture is heated at 110° C. until complete solution occurs, approximately 2 hours, and an additional 99 parts of dioxane is added to obtain a less viscous solution.

After cooling the reaction mixture to room temperature, ethyl Cellosolve (139 parts) is added to facilitate filtration, and the reaction mixture is filtered. The resulting solution has a non-volatile content of 56.4 percent as determined after heating for 2 hours at 180° C., and a viscosity of W (Gardner-Holdt). The polyepoxide has a weight per epoxide of 502 and a melting point of 143° C. (Durrans' mercury method).

Cured films are prepared from varying blends of the polyepoxide of this example with tetraethylene pentamine, or mixtures of tetraethylene pentamine with bisphenol, as shown in the following chart:

| Polyepoxide, Weight Percent | Bisphenol, Weight Percent | TEPA¹ Weight Percent | Bake | |
|---|---|---|---|---|
| | | | Time, Min. | Temp., ° C. |
| 95.2 | 0.0 | 4.8 | 30 | 150 |
| 88.0 | 9.8 | 2.2 | 30 | 150 |
| 94.9 | 0.0 | 5.1 | 30 | 150 |
| 87.7 | 9.9 | 2.4 | 30 | 150 |

¹ TEPA represents tetraethylene pentamine.

The colorless films resulting from the above cures exhibit good mar resistance, flexibility and adhesion, the cured films in which bisphenol is included in the blend showing greater flexibility. Air dried films of these blends (2 to 3 days) are comparable in properties. After an overbake (9 hours at 150° C.), films of these blends show no alteration in properties, except for a slight change in color.

*Example II*

The diepoxide used in this example was prepared as follows:

In a reaction vessel equipped with a thermometer, reflux condenser and agitator, about 555 parts (2.43 mols) of 2,2-bis (4-hydroxy phenyl) propane and 214 parts of water and heated at 29° C. for twenty minutes, whereupon 405 parts (4.38 mols) of epichlorhydrin are added rapidly. The temperature of the mixture is increased over a period of 15 minutes to 93-100° C. and is held at this temperature for one hour and 35 minutes. The mixture is separated into a two phase system and the aqueous layer is drawn off. The remaining resinous layer is washed with hot water and then is drained and dried at 140° C. The Durrans' mercury method melting point of the resulting product was 60° C. and the weight per epoxide 404.

In the same manner as described in Example I, cyanuric acid, 15.0 parts (0.116 mol) and the diepoxide of this example, 280.0 parts (0.347 mol) are reacted in the presence of 4.9 parts of a 60 percent aqueous solution of benzyltrimethylammonium chloride (1 percent by weight based on the weight of the reactants). Ethyl Cellosolve (255.0 parts) and dioxane (40.0 parts) are included as solvents for the reaction. After heating the reaction mixture at 110° C. until complete solution results, approximatley 1 hour, the reaction mixture is cooled and dioxane (148.0 parts) is added to facilitate filtration.

The resulting solution, after filtration, has a viscosity of $Z_1$ to $Z_2$ (Gardner-Holdt), a non volatile content of 42.7 percent (as determined, two hours at 180° C.). The polyepoxide has a melting point of 132° C. (Durrans' mercury method) and a weight per epoxy of 1160.

Films (3 mil) were prepared and baked for 30 minutes at 150° C., from a blend of 97.8 weight percent of the polyepoxide of this example with 2.2 weight percent of tetraethylene pentamine, and also with 95.9 weight percent of the polyepoxide with 2.4 weight percent of bisphenol and 1.7 weight percent of tetraethylene pentamine.

These cured blends produce films with good mar resistance, flexibility and adhesion, the blend containing bisphenol being more flexible. Air dried films (2 to 3 days) of these blends are comparable in properties. An overbake of 9 hours at 150° C. produces no difference in properties.

*Example III*

In accordance with the procedure outlined in Example I, a polyepoxide is prepared by reacting with the diepoxide prepared as described in Example I, 444 parts (1.2 mols), cyanuric acid, 51.6 parts (0.4 mol), in the presence of 4.13 parts of a 60 percent aqueous solution of benzyltrimethylammonium chloride (½ percent by weight based on the weight of the reactants). Dioxane (180.0 parts) and ethyl Cellosolve (560.0 parts) are employed as solvents for the reaction. After heating until complete solution occurs, approximately 2 hours, the reaction mixture is cooled and filtered. The resulting resinous solution has a viscosity of F (Gardner-Holdt), and a non-volatile content of 43.1 percent (as determined for two hours at 180° C.). The melting point of the polyepoxide is 140° C. (Durran's mercury method) and the epoxy equivalent of the resin is 464.

A white enamel is prepared using 550 parts of the polyepoxide of this example, 300 parts of titanium dioxide and 224 parts of methyl isobutyl ketone. When cured with 7 parts of tetraethylene pentamine, this enamel exhibits excellent hardness, toughness, and adhesion.

*Example IV*

The diepoxide used in this example was prepared as follows:

About 536 parts (2.35 mols) of bisphenol and 211 parts (5.17 mols) of sodium hydroxide (10 percent excess) are combined in 1900 parts of water and heated to about 23° C., whereupon 436 parts (4.70 mols) of epichlorhydrin are added rapidly. The temperature is increased and remains at about 90° C. to 100° C. for 1 hour and 40 minutes. The mixture is separated into a 2 phase system and the aqueous layer drawn off. The resinous layer that remains is washed with hot water and then drained and dried at a temperature of about 140° C. The Durrans' mercury method melting point of the resulting product is 50° C. and the weight per epoxide is 325.

In accordance with the procedure of Example I, a polyepoxide is prepared by reacting the diepoxide of this example, 292.5 parts (0.45 mol); with cyanuric acid, 20.4 parts (0.15 mol) in the presence of 2.5 parts of a 60 percent aqueous solution of benzyltrimethylammonium chloride (½ percent by weight based on the total weight of the reactants). After heating at 110° C. until complete solution results, approximately 3⅓ hours, the reaction mixture is cooled, 50 ml. of ethyl Cellosolve is added to reduce the viscosity of the solution, and the solution is filtered. The resulting solution containing the polyepoxide, has a viscosity of P (Gardner-Holdt), and a percent non-volatile matter of 52.9, as determined for 2 hours at 180° C.

The Durrans' mercury method melting point of the polyepoxide resin is 152° C., the weight per epoxide of the polyepoxide is 870.

A blend of 85 weight percent of the polyepoxide of this example with 15 weight percent of a butylated urea formaldehyde resin (sold under the trade name of Syn-U-Tex #402 by the Jones Dabney Company) is drawn down to a 3 mil film and cured by heating at 200° C., for 15 minutes. The cured film shows very good impact resistance and good flexibility.

Example V

Following the procedure outlined in Example I, a polyepoxide is prepared from the reaction of cyanuric acid, 19.35 parts (0.15 mol); with the diepoxide prepared in Example IV, 292.5 parts (0.45 mol); in the presence of 5.2 parts of a 60 percent aqueous solution of benzyltrimethylammonium chloride (1 percent by weight based on the weight of the reactants). Ethyl Cellosolve (269.6 parts) and dioxane (42.3 parts) are used as solvents for the reaction. After heating until complete solution results, approximately 2 hours at 110° C., 156.0 parts of dioxane is added to decrease the viscosity of the solution, the reaction mixture is cooled, and filtered. The resulting polyepoxide containing solution has a viscosity of D to E (Gardner-Holdt) and a 40.6 percent non-volatile content, as determined by heating at 180° C. for 2 hours.

The melting point of the polyepoxide is 132° C. (Durrans' mercury method) while the weight per epoxide of the polyepoxide is 1071.

Cured films prepared from blends of the polyepoxide of this example with various curing agents are illustrated in the following table:

| Film No. | Polyepoxide, Weight Percent | Curing Agent | Curing Agent, Weight Percent | Bake Time, Min. | Bake Temp., °C. | Film Thickness, Mils |
|---|---|---|---|---|---|---|
| 1 | 97.45 | TEPA* | 2.55 | 60 | 125 | 1.5 |
| 2 | 95.0 | TEPA* | 5.0 | 60 | 125 | 1.5 |
| 3 | 85.0 | Syn-U-Tex 402** | 15.0 | 15 | 200 | 1.5 |

*TEPA represents tetraethylene pentamine.
**Syn-U-Tex 402 is a trade name for a butylated ureaformaldehyde resin.

Properties of the above cures are as follows:

| Film No. | Properties | |
|---|---|---|
| | Impact Resistance | Flexibility |
| 1 | Excellent | Good. |
| 2 | do | Fair. |
| 3 | do | Very good. |

Example VI 5 mols of the resin of Example I were used with 2 mols of cyanuric acid. 190 parts (0.5 mol) of the resin, 25.8 parts (0.2 mol) of cyanuric acid, 150 parts of dioxane and 3 parts of a 60% aqueous solution of benzyl trimethyl ammonium chloride were heated with reflux at 107° C. for about 100 minutes, at which time all of the cyanuric acid had reacted. A solution of the resin at 50 solids in dioxane had a viscosity of P. The product of this example had a weight per epoxide of 563, indicating a composition approximating that of a tetraepoxide, the epoxide weight of which would be 540.

Solutions of the epoxide resin produced were mixed with 1, 2, 3, and 4%, respectively, of tetraethylene pentamine based on the solids in the solution, and films were drawn from the resulting solution and baked for 30 minutes at 150° C., giving cured films which were hard, tough and flexible.

Example VII

The proportions used in this example were 7 mols of the epoxide resin of Example I and 3 mols of cyanuric acid. 259 parts (0.7 mol) of the epoxy resin and 38.7 parts (0.3 mol) of cyanuric acid, together with 200 parts of dioxane and 6 parts of a 60% aqueous solution of benzyl trimethyl ammonium chloride, were refluxed for 80 minutes at 106° C., at which time all the cyanuric acid had dissolved and reacted. The proportions of this example are such as will be expected to give a theoretical product which would be a pentaepoxide having a weight per epoxide of 775. The resin produced by this example had a weight per epoxide of 852. The resin had a viscosity of Y in a 40% solids solution in dioxane.

Solutions of the resin were mixed with the catalyst described in Example VI and in similar proportions and films were similarly drawn and baked and gave cured films which were hard, tough and flexible.

Example VIII

The resin used in this example was an epoxide resin resulting from the reaction of bisphenol and epichlorhydrin in the presence of caustic alkali and having a melting point of 75 to 80° C. and a weight per epoxide of 586. The proportions of resin and cyanuric acid were such that there were 3 mols of the resin, considered as a diepoxide, for each mol of cyanuric acid.

In this example 175.8 parts (0.15 mol) of the resin, 6.45 parts (0.05 mol) cyanuric acid, 250 parts of dioxane and 3 parts of a 60% aqueous solution of benzyl trimethyl ammonium chloride were heated and refluxed for about 5 hours, giving a high molecular weight epoxide resin which had a weight per epoxide of 1665 and a viscosity of $Z_1$ in 40% solid solution.

Solutions used to produce films with the catalyst described in Example VI and baking as described gave cured films which are hard, tough and flexible.

Example IX

The resin used in this example was an epoxide resin produced from bisphenol and epichlorhydrin in the presence of caustic alkali and having a melting point of 95–105° C. and a weight per epoxide of 900. The proportions of resin and cyanuric acid used were 3 mols of resin to one mol of cyanuric acid, considering one mol of resin to be the amount corresponding to two epoxide groups.

A mixture of 54 parts (0.03 mol) of the resin, 1.29 parts (0.01 mol) of cyanuric acid, 60 parts of dioxane and 0.5 part of benzyl trimethyl ammonium chloride was refluxed for 3 hours. At this time a small amount of the cyanuric acid remained unreacted and the reaction was approaching the point of gelation and was discontinued. The resin produced at this time had a weight per epoxide of 2630 and a viscosity of V in 40% solids in dioxane. Films produced from this reaction as described in Example VI gave cured films which are hard, tough and flexible.

The high molecular weight resins of the present invention are capable of use with curing agents to form cured products of various kinds, including molded products, adhesives, coatings, etc. They have the advantage of being of high molecular weight and with at least three epoxy groups per molecule, so that they are readily cross-linked by cross-linking agents to produce cured products.

I claim:

1. The method of producing high molecular weight, soluble, fusible polyepoxides which comprises reacting with heat, in admixture with an organic base as a catalyst, a diepoxide selected from the group consisting of diglycidyl ethers of polyhydric phenols and diglycidyl ethers of polyhydric alcohols and cyanuric acid in such proportions that there are from about 1.5 to 2 epoxide groups of the diepoxide for each of the hydroxyl groups of the cyanuric acid, the amount of heat supplied to the reaction mass being insufficient to render the reaction product insoluble and infusible.

2. High molecular weight, soluble, fusible polyepoxides resulting from the method of claim 1.

References Cited in the file of this patent

UNITED STATES PATENTS

| | | |
|---|---|---|
| 2,521,911 | Greenlee | Sept. 12, 1950 |
| 2,801,229 | De Hoff et al. | July 30, 1957 |
| 2,801,989 | Farnham | Aug. 6, 1957 |

FOREIGN PATENTS

| | | |
|---|---|---|
| 133,819 | Australia | Aug. 10, 1949 |